(12) United States Patent
Vogel

(10) Patent No.: US 6,943,133 B2
(45) Date of Patent: Sep. 13, 2005

(54) DIENE FUNCTIONALIZED CATALYST SUPPORTS AND SUPPORTED CATALYST COMPOSITIONS

(75) Inventor: Alexander Vogel, Houston, TX (US)

(73) Assignee: Univation Technologies, LLC, Houston, TX (US)

(*) Notice: Subject to any disclaimer, the term of this patent is extended or adjusted under 35 U.S.C. 154(b) by 551 days.

(21) Appl. No.: 10/001,393

(22) Filed: Oct. 23, 2001

(65) Prior Publication Data

US 2002/0082161 A1 Jun. 27, 2002

Related U.S. Application Data

(60) Provisional application No. 60/241,969, filed on Oct. 20, 2000.

(51) Int. Cl.$^7$ .......................... C08F 4/44; C08F 136/04; C08F 136/20; B01J 31/38
(52) U.S. Cl. .................. 502/104; 502/152; 502/155; 526/127; 526/160; 526/161; 526/943; 526/335; 526/336
(58) Field of Search .................. 502/104, 152, 502/155; 526/127, 160, 161, 943, 335, 336

(56) References Cited

U.S. PATENT DOCUMENTS

| | | | |
|---|---|---|---|
| 4,543,399 A | 9/1985 | Jenkens, III et al. | |
| 5,064,802 A | 11/1991 | Stevens et al. | |
| 5,132,380 A | 7/1992 | Stevens et al. | |
| 5,153,157 A | 10/1992 | Hlatky et al. | |
| 5,189,192 A | 2/1993 | LaPointe et al. | |
| 5,198,401 A | 3/1993 | Turner et al. | |
| 5,296,433 A | 3/1994 | Siedle et al. | |
| 5,321,106 A | 6/1994 | LaPointe | |
| 5,350,723 A | 9/1994 | Neithamer et al. | |
| 5,352,749 A | 10/1994 | DeChellis et al. | |
| 5,425,872 A | 6/1995 | Devore et al. | |
| 5,427,991 A | 6/1995 | Turner | |
| 5,453,410 A | 9/1995 | Kolthammer et al. | |
| 5,470,927 A | 11/1995 | Turner et al. | |
| 5,470,993 A | 11/1995 | Devore et al. | |
| 5,527,929 A | 6/1996 | Timmers et al. | |
| 5,556,928 A | 9/1996 | Devore et al. | |
| 5,587,439 A | 12/1996 | DiMaio | |
| 5,616,664 A | 4/1997 | Timmers et al. | |
| 5,624,878 A | 4/1997 | Devore et al. | |
| 5,625,087 A | 4/1997 | Devore et al. | |
| 5,626,087 A | 5/1997 | Lompa | |
| 5,643,847 A | 7/1997 | Walzer, Jr. | |
| 5,721,185 A | 2/1998 | LaPointe et al. | |
| 5,763,547 A | 6/1998 | Kolthammer et al. | |
| 5,783,512 A | 7/1998 | Jacobsen et al. | |
| 5,883,204 A | 3/1999 | Spencer et al. | |
| 5,919,983 A | 7/1999 | Rosen et al. | |
| 6,040,261 A | 3/2000 | Hlatky | |
| 6,150,297 A | * 11/2000 | Campbell et al. | 502/152 |

FOREIGN PATENT DOCUMENTS

| | | |
|---|---|---|
| EP | 0 089 691 A2 | 9/1983 |
| EP | 0 277 003 A1 | 8/1988 |
| EP | 0 520 732 A1 | 12/1992 |
| EP | 0 824 112 A1 | 2/1998 |
| WO | WO 94/25495 A1 | 11/1994 |
| WO | WO 94/28032 A1 | 12/1994 |
| WO | WO 97/43323 A1 | 11/1997 |
| WO | WO 97/44371 A1 | 11/1997 |
| WO | WO 98/03521 A | 1/1998 |
| WO | WO 98/09913 A | 3/1998 |
| WO | WO 99/15534 A1 | 4/1999 |
| WO | WO 99/42467 A1 | 8/1999 |

OTHER PUBLICATIONS

Hird et al., Solid Phase Synthesis of 2–Aminobutadienes Using a Piperazine Linker, *Tetrahedron Letters*, 1997, pp. 7111–7114, vol. 38, No. 40, Elsevier Science Publishers, Amsterdam NL.

* cited by examiner

Primary Examiner—Robert D. Harlan

(57) ABSTRACT

The present invention relates to functionalized catalyst supports that are useful in the formation of supported polymerization catalysts, supported catalysts derived from such functionalized catalyst supports, methods for preparing such functionalized catalyst supports and supported catalysts, and polymerization processes utilizing such supported catalysts. The functionalized catalyst supports comprise a particulated, solid support material having chemically bonded thereto a plurality of conjugated or non-conjugated diene or alkyne functionalized ligand groups, said composition being capable of reacting with and tethering a catalytically activatable Group 3–10 or Lanthanide metal complex thereto.

10 Claims, No Drawings

DIENE FUNCTIONALIZED CATALYST SUPPORTS AND SUPPORTED CATALYST COMPOSITIONS

PRIOR RELATED APPLICATIONS

This application claims priority to U.S. provisional patent application Ser. No. 60/241,969, filed on Oct. 20, 2000.

FEDERALLY SPONSORED RESEARCH STATEMENT

Not applicable.

REFERENCE TO MICROFICHE APPENDIX

Not applicable.

FIELD OF THE INVENTION

The present invention relates to functionalized catalyst supports that are useful in the formation of supported polymerization catalysts. The present invention further relates to supported catalysts obtainable using such functionalized catalyst supports, which supported catalysts are particularly adapted for use in a polymerization process wherein at least one polymerizable olefin monomer is contacted with the supported catalyst under polymerization conditions to form a polymeric product. The present invention further pertains to methods for making such functionalized catalyst supports and supported catalysts. The present invention further pertains to polymerization processes utilizing such supported catalysts.

BACKGROUND OF THE INVENTION

It is previously known in the art to activate Ziegler-Natta polymerization catalysts, particularly such catalysts comprising Group 3–10 metal complexes containing delocalized π-bonded ligand groups, by the use of an activator. Generally in the absence of such an activator compound, also referred to as a cocatalyst, little or no polymerization activity is observed. A class of suitable activators are aluminoxanes, or alkylaluminoxanes, which are generally believed to be oligomeric or polymeric alkylaluminoxy compounds, including cyclic oligomers. Generally such compounds contain, on average about 1.5 alkyl groups per aluminum atom, and are prepared by reaction of trialkylaluminum compounds or mixtures of compounds with water (Reddy et al, *Prog. Poly. Sci.*, 1995, 20, 309–367). The resulting product is in fact a mixture of various substituted aluminum compounds including especially, trialklyaluminum compounds (resulting from incomplete reaction of the trialkylaluminum starting reagent or decomposition of the alumoxane). The amount of such free trialkylaluminum compound in the mixture generally varies from 1 to 50 percent by weight of the total product. Examples of alumoxanes include methylalumoxane (MAO) made by hydrolysis of trimethylaluminum as well as modified methylalumoxane (MMAO), made by hydrolysis of a mixture of trimethylaluminum and triisobutylaluminum. While such activators normally are soluble in hydrocarbons (homogeneous cocatalyst), supported versions may be prepared by fixing the alumoxane to a solid, particulated substrate. Silica having alumoxane, particularly methylalumoxane, chemically bonded thereto, presumably by reaction to form a silicon/oxygen/aluminum bond, is also well known and commercially available. Disadvantageously, such a heterogeneous, supported cocatalyst does not demonstrate significant cocatalytic efficiency due in part possibly to the oligomeric nature and low Lewis acidity of alumoxane.

A different type of activator compound is a Bronsted acid salt capable of transferring a proton to form a cationic derivative or other catalytically active derivatiive of such a Group 3–10 metal complex. Examples of such Bronsted acid salts are protonated ammonium, sulfonium, or phosphonium salts capable of transferring a hydrogen ion, disclosed in U.S. Pat. Nos. 5,198,401, 5,132,380, 5,470,927, and 5,153,157, as well as oxidizing salts such as lead, silver, carbonium, ferrocenium and silyilium salts, disclosed in U.S. Pat. Nos. 5,350,723, 5,189,192 and 5,626,087. Supported or polyionic salt activators disclosed in U.S. Pat. No. 5,427,991 are prepared by chemically binding a plurality of such salt anions to a core component. Disadvantageously, activation of a neutral metal complex by means of a proton transfer mechanism unavoidably produces a neutral by-product, such as an amine, that can interfere with subsequent catalyst activity.

Further suitable activators for the above metal complexes include strong Lewis acids including (trisperfluorophenyl) borane and tris(perfluorobiphenyl)borane. The former composition has been previously disclosed for the above stated end use in EP-A-520,732, and elsewhere, whereas the latter composition is disclosed in Marks, et al., *J. Am. Chem. Soc.*, 118, 12451–12452 (1996). Additional teachings of the foregoing activators may be found in Chen, et al, *J. Am. Chem. Soc.* 1997, 119, 2582–2583, Jia et al, *Organometallics*, 1997, 16, 842–857. and Coles et al, *J. Am. Chem. Soc.* 1997, 119, 8126–8126. All of the foregoing Lewis acid activators in practice are based on perfluorophenyl substituted boron compounds. Use of such activator compounds in a supported catalyst system has met with limited success due to the difficulty in retaining the activator on the support surface.

In U.S. Pat. No. 5,453,410, an alumoxane, particularly methylalumoxane, was disclosed for use in combination with constrained geometry, Group 4 metal complexes, especially in a molar ratio of metal complex to alumoxane of from 1/1 to 1/50. This combination beneficially resulted in improved polymerization efficiency. Similarly, in U.S. Pat. Nos. 5,527,929, 5,616,664, 5,470,993, 5,556,928, 5,624,878, various combinations of metal complexes with trispentafluorophenyl boron cocatalyst, and optionally an alumoxane, were disclosed for use as catalyst compositions for olefin polymerization.

U.S. Pat. No. 5,763,547 discloses a slurry polymerization process using a supported catalyst formed by slurrying a silica/alumoxane support with a solution of a monocyclopentadienyl Group IV metal complex in ISOPAR E, and subsequently briefly contacting with a borane activator.

WO 97/44371 discloses a gas phase polymerization process using a supported catalyst formed by contacting a dried or calcined silica support (optionally pretreated with water) with triethylaluminum, slurrying the support with toluene and contacting with a solution of a borane, and subsequently contacting with a solution of a monocyclopentadienyl Group IV metal complex in toluene. Representative polymer compositions disclosed demonstrated improved rheological performance, and a rising comonomer distribution.

WO 97/43323 discloses slurry polymerization processes utilizing a supported catalyst formed by depositing a monocyclopentadienyl Group IV metal complex and a perfluorophenyl borate onto a dried and/or calcined silica support which has been passivated with a trialkylaluminum compound. Representative polymer compositions demonstrated a rising comonomer distribution.

EP 824112A1 discloses a supported composition wherein a Group IIIA metal-containing compound is directly (or through a spacer) covalently bonded to a moiety on the support, which compound may be of neutral or ionic construction, and which forms a catalyst system with a transition metal compound, such as a metallocene. Although aluminum-containing compounds are broadly disclosed as suitable Group IIIA metal-containing compounds, no example describes their use; nor do any teachings recognize any unexpected utility of aluminum-containing species.

U.S. Pat. No. 5,643,847 discloses a catalyst composition comprising a metal oxide support having a counter anion derived from a Lewis acid not having readily hydrolyzable ligands (such as a tri-perfluorophenyl borane) covalently bound to the surface of the support directly through the oxygen atom of the metal oxide, wherein the anion is also ionically bound to a catalytically active transition metal compound.

It would be desirable if there were provided functionalized catalyst supports, more particularly, it would be desirable if there were provided a functionalized support material adapted to chemically bind the metal complex, especially a Group 4 metal complex to the surface thereof and to supported catalyst systems obtainable from the activation of a metal complex using such functionalized catalyst supports, for use in olefin polymerizations that could be employed in slurry, solid phase, gas phase or high pressure polymerizations.

SUMMARY OF THE INVENTION

Accordingly, the subject invention provides a functionalized catalyst support comprising a particulated, solid support material having chemically bonded thereto a conjugated or non-conjugated diene or alkyne containing ligand group.

The subject invention further provides a catalytically active, supported catalyst composition comprising the reaction product of:
  (a) the foregoing functionalized caytalyst support, and
  (b) a Group 3–10 or Lanthanide metal complex containing a substituent which reacts with the functionalized catalyst support to thereby form a supported catalyst composition that is capable of activation to form an active polymerization catalyst for the polymerization of addition polymerizable monomers.

The subject invention further provides a method for preparing a functionalized catalyst support comprising contacting:
  a. a particulated support containing functionality a' capable of reacting with reactive functionality b' of a conjugated or non-conjugated diene or alkyne containing compound, and
  b. a conjugated or non-conjugated diene or alkyne compound containing reactive functionality b' capable of reacting with the reactive functionality a' of component a,
under conditions to cause reaction between functional groups a' and b' and thereby form the functionalized catalyst support.

The subject invention further provides a method for preparing a supported catalyst for use in polymerization of addition polymerizable monomers comprising:
  (a) contacting the foregoing functionalized catalyst support containing a conjugated or non-conjugated diene or alkyne group, and
  (b) a Group 3–10 or Lanthanide metal complex containing a substituent which reacts with the functionalized catalyst support to thereby form a supported catalyst composition that is capable of being activated for the polymerization of addition polymerizable monomers.

Finally, the present invention provides a polymerization process comprising contacting one or more addition polymerizable monomers under gas phase, high pressure or slurry polymerization conditions with a supported catalyst composition of the invention and optionally an activator.

BRIEF DESCRIPTION OF THE DRAWINGS

Not applicable.

DESCRIPTION OF EMBODIMENTS OF THE INVENTION

The functionalized catalyst support of the invention in a preferred embodiment may be depicted as a chemical structure of the following formula:

$$So(D_d)$$

wherein:

So is a particulated, solid support material;

D is a conjugated or non-conjugated diene or alkyne containing ligand attached to the particulated solid support containing up to 20 atoms other than hydrogen; and d is a positive number that is equal to the number of D groups attached to the substrate, So. Preferably d is chosen to provide a concentration of D groups on the substrate from $1 \times 10^{-5}$ μmole/gram to 1 mmole/gram, more preferably from 0.1 μmole/gram to 500 μmole/g.

The functionalized catalyst supports of the invention are readily prepared by combining a particulated support material having reactive functional groups a', on the surface thereof, with a conjugated or non-conjugated diene- or alkyne-containing compound, containing reactive groups b', that are able to react with the functional surface groups of the support, preferably under conditions to chemically attach the D ligand, optionally followed by the step of removing byproducts formed by the reaction. Preferred supports and reactive conjugated or non-conjugated diene compounds are those containing reactive a' and b' functionality capable of reacting under mild conditions to form by-products that are either readily removed from the reaction environment or are not detrimental to desired uses of the functionalized catalyst supports.

Preferred particulated, solid, support materials, are those possessing non-ionic, Lewis acid functionality a', of the formula -$Me_mK_k$, on the surface thereof, wherein:

Me, is a Group 2, 12 or 13 metal, especially Al, bonded to the substrate, So,

K is an extractable or exchangeable, anionic ligand group, especially a hydrocarbyl or halohydrocarbyl group of up to 20 atoms, not counting hydrogen, and m and k are selected to provide charge balance.

Preferred Lewis acid functionality includes, alkylaluminum- and (fluoroaryl)aluminum-functionality, or mixtures thereof, containing from 1 to 20 carbons in each alkyl group and from 6 to 20 carbons in each fluoroaryl group, most preferably methylaluminum-, ethylaluminum-, isopropylaluminum-, or isobutylaluminum functionality.

Such functionality must be capable of reacting with a reactive functionality of the diene or alkyne containing compound to covalently bond thereto, thereby generating the functionalized catalyst support in the process. In a preferred embodiment, the Lewis acid functionality is generated by reaction of non-ionic Lewis acid with a support material containing reactive hydroxyl, silane or chlorosilane functionality.

Preferred reactants are those capable of bonding to a hydroxyl, hydrocarbyloxy, hydrocarbylmetal or hydrocarbylmetalloid functionality of a functionalized diene or alkyne containing compound, preferably by a ligand exchange mechanism, thereby generating an oxy-metal or oxy-metalloid containing linking group. It should be understood that the linking group may be a component of either the substrate or the non-ionic Lewis acid used to generate the present compositions, or constitute a remnant resulting from the reaction of such components. Preferably, the linking group will be an oxygen-containing bridging moiety, more preferably the oxygen contributed by the hydroxyl group of an optionally, but preferably, thermally dehydrated, silica support.

Examples of suitable non-ionic, Lewis acids for use in the preparation of the functionalized supports of the invention include trialkylaluminum and tri(haloalkyl)aluminum compounds, and mixtures of Lewis acids corresponding to the formula:

$$[(-AlQ^1-O-)_z(-AlAr^f-O-)_{z'}](Ar^f_{z''}Al_2Q^1_{6-z''})$$

where;

Q$^1$ independently each occurrence is selected from hydrocarbyl, hydrocarbyloxy, or dihydrocarbylamido, of from 1 to 20 atoms other than hydrogen;

Ar$^f$ is a fluorinated aromatic hydrocarbyl moiety of from 6 to 30 carbon atoms;

z is a number from 1 to 50, preferably from 1.5 to 40, more preferably from 2 to 30, and the moiety (—AlQ$^1$-O—) is a cyclic or linear oligomer with a repeat unit of 2–30;

z' is a number from 1 to 50, preferably from 1.5 to 40, more preferably from 2 to 30, and the moiety (—AlAr$^f$—O—) is a cyclic or linear oligomer with a repeat unit of 2–30; and z'' is a number from 0 to 6, and the moiety (Ar$^f_{z''}$Al$_2$Q$^1_{6-z''}$) is either tri(fluoroarylaluminum), trialkylaluminum, a dialkylaluminumalkoxide, a dialkylaluminum (dialkylamide) or an adduct of tri(fluoroarylaluminum) with a sub-stoichiometric to super-stoichiometric amount of a trialkylaluminum.

The moieties (Ar$^f_{z''}$Al$_2$Q$^1_{6-z''}$) may exist as discrete entities or dynamic exchange products. That is, such moieties may be in the form of dimeric or other multiple centered products in combination with metal complexes and other organometallic compounds, including those resulting from partial or complete ligand exchange during the process used for their manufacture. Such more complex mixture of compounds may result from a combination of the foregoing compounds, which are Lewis acid adducts, with other compounds such as metallocenes or alumoxanes. Such exchange products may be fluxional in nature, the concentration thereof being dependant on time, temperature, solution concentration and the presence of other species able to stabilize the compounds, thereby preventing or slowing further ligand exchange. Preferably z'' is from 1–5, more preferably from 1–3.

The foregoing class of non-ionic Lewis acids are also suitable for use in the present invention in the absence of aluminumoxy species. Such compounds accordingly are adducts corresponding to the formula:

$$Ar^f_zAl_2Q^1_{6-z}$$

where Ar$^f$, Q$^1$ and z are as previously defined.

Preferred non-ionic Lewis acids for use herein are those of the foregoing formula wherein:

Q$^1$ independently each occurrence is selected from C$_{1-20}$ alkyl;

Ar$^f$ is a fluorinated aromatic hydrocarbyl moiety of from 6 to 30 carbon atoms;

z is a number greater than 0 and less than 6, and the moiety: Ar$^f_z$Al$_2$Q$^1_{6-z}$ is an adduct of tri (fluoroarylaluminum) with from a sub-stoichiometric to a super-stoichiometric amount of a trialkylaluminum having from 1 to 20 carbons in each alkyl group.

Examples of specific, non-ionic aluminum Lewis acid reagents for use herein, reagent ratios, and resulting products are illustrated as follows:

$$Ar^f_3Al + Q^1_3Al \rightarrow Ar^f_3Al_2Q^1_3 (Ar^f_3Al.AlQ^1_3)$$

$$Ar^f_3B + 2Q^1_3Al \rightarrow Ar^f_3Al_2Q^1_3 + BQ^1_3 (Ar^f_3Al.AlQ^1_3)$$

$$Ar^f_3Al + 2Q^1_3Al \rightarrow 3Ar^f AlQ^1_2 \rightarrow 2/3 Ar^f_3Al_2Q^1_4 (Ar^f_3Al.2AlQ^1_3)$$

$$Ar^f_3Al + 5Q^1_3Al \rightarrow 3Ar^f Al_2Q^1_5 (Ar^f_3Al.5AlQ^1_3)$$

$$Ar^f_3Al + 10Q^1_3Al \rightarrow 3Ar^f Al_2Q^1_5 + 5Q^1_3Al (Ar^f_3Al.10Ar^f Al_2Q^1_5)$$

$$2Ar^f_3B + 3Q^1_3Al \rightarrow 3Ar^f_2AlQ^1 + 2BQ^1_3 \rightarrow Ar^f_4Al_2Q^1_2 (Ar^f_3Al.1/2AlQ^1_3)$$

$$5Ar^f_3B + 6Q^1_3Al \rightarrow 5BQ^1_3 + Ar^f_5Al_2Q^1 (Ar^f_3Al.1/5AlQ^1_3)$$

The foregoing mixtures of non-ionic Lewis acids and adducts may be readily prepared by combining the tri (fluoroaryl)aluminum compound and trialkylaluminum compound. The reaction may be performed in a solvent or diluent, or neat. Intimate contacting of the neat reactants can be effectively achieved by drying a solution of the two reactants to form a solid mixture, and thereafter optionally continuing such contacting, optionally at an elevated temperature. Preferred tri(fluoroaryl)aluminum compounds are tris(perfluoroaryl)aluminum compounds, most preferably tris(pentafluorophenyl) aluminum. The latter compound may be readily prepared by ligand exchange of a trifluoroarylboron compound and a trialkylaluminum compound, especially trimethyl aluminum or by reaction of a fluoroarylborane, preferably tris(pentafluorophenyl)borane with greater than a stoichiometric amount of one or more dihydrocarbylaluminumhydrocarbyloxides, or dihydrocarbylaluminum(di-hydrocarbyl)amide compounds having up to 20 atoms other than hydrogen in each hydrocarbyl, hydrocarbyloxy or dihydrocarbylamide group, or a mixture thereof with one or more aluminoxy compounds (such as an alumoxane) substantially according to the conditions disclosed in U.S. Pat. No. 5,602,269.

Generally the various reagents which form non-ionic Lewis acids for use in the invention, such as the trifluoroarylboron compound and the trialkylaluminum compound are merely contacted in a hydrocarbon liquid at a temperature from 0 to 75° C., for a period from one minute to 10 days. Preferably, such contacting occurs for a period from 1 minute to 1 day, preferably at least 30 minutes to permit ligand exchange to occur to an extent sufficient to yield the advantages associated with the practice of the invention.

Preferred support materials are finely particulated materials that remain solids under conditions of preparation and use and that do not interfere with subsequent polymerizations or other uses of the composition of the invention. Suitable support materials especially include particulated metal oxides, oxides of silicon or germanium, polymers, and mixtures thereof. Examples include alumina, silica, aluminosilicates, clay, and particulated polyolefins. Suitable volume average particle sizes of the support are from 1 to 1000 μM, preferably from 10 to 100 μM. Most desired supports are silica, which is thoroughly dried, suitably by heating to 200 to 900° C. for from 10 minutes to 2 days. The silica may be treated prior to use to further reduce surface hydroxyl groups thereon, or to introduce more reactive functionality than the available hydroxyl functionality for subsequent reaction with the Lewis acid. Suitable treatments include reaction with a tri(C$_{1-10}$ alkyl)silylhalide, hexa(C$_{1-10}$ alkyl)disilazane, tri(C$_{1-10}$ alkyl)aluminum, or similar reactive compound, preferably by contacting the support and a hydrocarbon solution of the reactive compound.

In a preferred embodiment, thermally dehydrated silica is reacted with a tri(alkyl)aluminum, preferably a C$_{1-10}$ tri (alkyl)aluminum, most preferably, trimethylaluminum, triethylaluminum, triisopropylaluminum or triisobutylaluminum, to form a modified support. The amount of the trialkylaluminum is chosen to pacify 50–100 percent of the reactive surface species, more preferably 90–100 percent, as determined by titration with Et$_3$Al. Titration with Et$_3$Al is defined as the maximum amount of aluminum that chemically reacts with the particulated solid support material and which cannot be removed by washing with an inert hydrocarbon or aromatic solvent. Thereafter this modified support is contacted with the above functionalized diene compound, or a solution thereof, in a quantity sufficient to provide a functionalized catalyst support according to the invention.

Particulated polymeric supports, while less preferred than inorganic oxide supports, may be utilized as well. Such particulated polymeric supports are preferably also functionalized to provide hydroxyl, carboxylic acid or sulfonic acid reactive groups. The resulting substrate material formed by reaction with the non-ionic Lewis acid will accordingly bear the corresponding oxy-, carboxy- or sulfoxy-linking group, joining the non-ionic Lewis acid remnant to the support.

The non-ionic Lewis acid and particulated support material may be combined and reacted in an aliphatic, alicyclic or aromatic liquid diluent, or solvent, or mixture thereof. Preferred diluents or solvents are C$_{4-10}$ hydrocarbons and mixtures thereof, including hexane, heptane, cyclohexane, and mixed fractions such as Isopar™ E, available from Exxon Chemicals Inc. Preferred contacting times are at least one minute, preferably at least 150 minutes, at a temperature from 0 to 75° C., preferably from 20 to 50° C., most preferably from 25 to 35° C. After contacting of the support and Lewis acid, the reaction mixture may be purified to remove byproducts, especially any trialkylboron compounds by any suitable technique.

Suitable techniques for removing byproducts from the reaction mixture include degassing, optionally at reduced pressures, distillation, solvent exchange, solvent extraction, extraction with a volatile agent, and combinations of the foregoing techniques, all of which are conducted according to conventional procedures. Preferably the quantity of residual byproduct is less than 10 weight percent, more preferably less than 1.0 weight percent, most preferably less than 0.1 weight percent, based on the weight of the functionalized catalyst support.

The functionalized support material is derived from the nonionic Lewis acid functionalized support material and the conjugated or non-conjugated diene by further reaction of the a' and b' functionalities thereof. Preferred b' functionality on the conjugated or non-conjugated diene compound are hydroxyl, hydrocarbyloxy, hydrocarbylmetal or hydrocarbylmetalloid functionality, as previously mentioned. Preferred b' functionality are hydroxyl groups. A most preferred functionalized conjugated or non-conjugated diene is an α-hydroxyl-substituted conjugated diene, containing terminal diene functionality, most preferably trans-8, trans-10-dodecadien-1-ol. The functionalized diene containing compound and functionalized support material are combined under conditions to chemically attach a plurality of the conjugated or non-conjugated functional groups to the surface of the support.

Suitably the two reagents may be combined and reacted in an aliphatic, alicyclic or aromatic liquid diluent, or solvent, or mixture thereof. Preferred diluents or solvents are C$_{4-10}$ hydrocarbons and mixtures thereof, including hexane, heptane, cyclohexane, and mixed fractions such as Isopar™ E, available from Exxon Chemicals Inc. Preferred contacting times are at least one minute, preferably at least 30 minutes, at a temperature from 0 to 75° C., preferably from 20 to 50° C., most preferably from 25 to 35° C. After contacting of the non-ionic Lewis acid functionalized support and functionalized conjugated or non-conjugated diene compound, the reaction mixture may be purified to remove byproducts by any suitable technique, especially devolatilization of the mixture.

Supported catalyst compositions are prepared by adding a metal complex or a mixture of metal complexes to be tethered or chemically bound to the surface of the above disclosed functionalized catalyst support. The molar ratio of metal complex to conjugated or non-conjugated diene functionality on the surface of the support material is preferably from 0.1:1 to 3:1, more preferably from 0.2:1 to 2:1, most preferably from 0.25:1 to 1:1. In most polymerization reactions the molar ratio of metal complex: polymerizable compound employed is from $10^{-12}$:1 to $10^{-1}$:1, more preferably from $10^{-12}$:1 to $10^{-5}$:1. Any suitable means for contacting the metal complex and support may be used, including dispersing or dissolving the metal complex in a liquid and contacting the mixture or solution with the support by slurrying, impregnating, spraying, or coating and thereafter removing the liquid, or by combining the metal complex and support material in dry or paste form and intimately contacting the mixture, thereafter forming a dried, particulated product.

Suitable metal complexes for use in combination with the foregoing functionalized catalyst supports include any complex of a metal of Groups 3–10 of the Periodic Table of the Elements capable of being activated to polymerize addition polymerizable compounds, especially olefins by an activator, and containing a substitutent capable of reaction with the conjugated or non-conjugated diene functionality of the substrate.

Suitable complexes include derivatives of Group 3, 4, or Lanthanide metals containing from 1 to 3 π-bonded anionic or neutral ligand groups, which may be cyclic or non-cyclic delocalized π-bonded anionic ligand groups. Exemplary of such π-bonded anionic ligand groups are conjugated or nonconjugated, cyclic or non-cyclic dienyl groups, allyl groups, boratabenzene groups, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are C$_{1-20}$ straight, branched and cyclic alkyl radicals, C$_{6-20}$ aromatic radicals, C$_{7-20}$ alkyl-substituted aromatic radicals, and C$_{7-20}$ aryl-substituted alkyl radicals. In addition two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or divalent derivatives thereof, e. g. amide, phosphide, ether or thioether groups bonded to the transition metal or Lanthanide metal, and bonded to the hydrocarbyl group or to the hydrocarbyl-substituted metalloid containing group.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, and boratabenzene groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

Suitable metal complexes include Group 10 diimine derivatives corresponding to the formula:

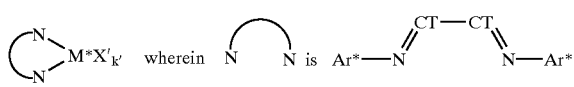

M* is Ni(II) or Pd(II);

X' is halo, hydrocarbyl, or hydrocarbyloxy;

Ar* is an aryl group, especially 2,6-diisopropylphenyl or aniline group;

CT-CT is 1,2-ethanediyl, 2,3-butanediyl, or form a fused ring system wherein the two T groups together are a 1,8-naphthanediyl group; and k' is a number from 1 to 3 selected to provide charge balance.

Similar complexes to the foregoing are also disclosed by M. Brookhart, et al., in *J. Am. Chem. Soc.*, 118, 267–268 (1996) and *J. Am. Chem. Soc.*, 117, 6414–6415 (1995), as being active polymerization catalysts especially for polymerization of α-olefins, either alone or in combination with polar comonomers such as vinyl chloride, alkyl acrylates and alkyl methacrylates.

The boratabenzenes are anionic ligands which are boron containing analogues to benzene. They are previously known in the art having been described by G. Herberich, et al., in *Organometallics*, 1995, 14, 1, 471–480. Preferred boratabenzenes correspond to the formula:

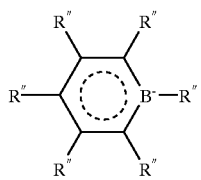

wherein R" is selected from the group consisting of hydrocarbyl, silyl, or germyl, said R" having up to 20 non-hydrogen atoms. In complexes involving divalent derivatives of such delocalized π-bonded groups one atom thereof is bonded by means of a covalent bond or a covalently bonded divalent group to another atom of the complex thereby forming a bridged system.

More preferred are metal complexes corresponding to the formula:

$L_lMX_mX'_nX''_p$, or a dimer thereof wherein:

L is an anionic, delocalized, π-bonded group that is bound to M, containing up to 50 nonhydrogen atoms, optionally two L groups may be joined together through one or more substituents thereby forming a bridged structure, and further optionally one L may be bound to X through one or more substituents of L;

M is a metal of Group 4 of the Periodic Table of the Elements in the +3 or +4 formal oxidation state;

X is an optional, divalent substituent of up to 50 non-hydrogen atoms that together with L forms a metallocycle with M;

X' is an optional neutral Lewis base having up to 20 non-hydrogen atoms;

X" each occurrence is a monovalent, anionic moiety having up to 40 non-hydrogen atoms, optionally, two X" groups may be covalently bound together forming a divalent dianionic moiety having both valences bound to M, or further optionally one or more X" and one or more X' groups may be bonded together thereby forming a moiety that is both covalently bound to M and coordinated thereto by means of Lewis base functionality;

l is 1 or 2;

m is 0 or 1;

n is a number from 0 to 3;

p is an integer from 0 to 3; and the sum, l+m+p, is equal to the formal oxidation state of M.

Such preferred complexes include those containing either one or two L groups. The latter complexes include those containing a bridging group linking the two L groups. Preferred bridging groups are those corresponding to the formula $(ER^*_2)_x$ wherein E is silicon or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, benzyl, tert-butyl or phenyl.

Examples of the foregoing bis(L) containing complexes are compounds corresponding to the formula:

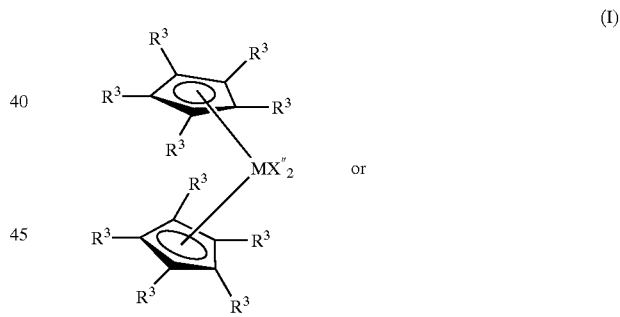

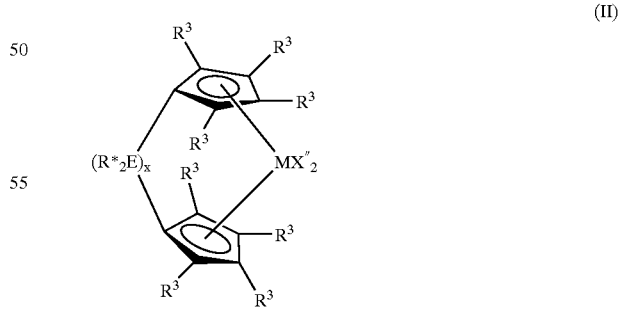

wherein:

M is titanium, zirconium or hafnium, preferably zirconium or hafnium, in the +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 nonhydrogen atoms, or two X" groups together form a divalent anionic ligand group of up to 40 nonhydrogen atoms, and R*, E and x are as previously defined.

The foregoing metal complexes are especially suited for the preparation of polymers having stereoregular molecular structure. In such capacity it is preferred that the complex possess $C_2$ symmetry or possess a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include bis-indenyl complexes. Similar systems based on Ti(IV) or Zr(IV) were disclosed for preparation of isotactic olefin polymers in Wild et al., *J. Organomet. Chem*, 232, 233–47, (1982).

Exemplary bridged ligands containing two π-bonded groups are: (dimethylsilyl-bis-cyclopentadienyl), (dimethylsilyl-bis-methylcyclopentadienyl), (dimethylsilyl-bis-ethylcyclopentadienyl, (dimethylsilyl-bis-t-butylcyclopentadienyl), (dimethylsilyl-bis-tetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilyl-cyclopentadienyl-fluorenyl), (1,1,2,2-tetramethyl-1,2-disilyl-bis-cyclopentadienyl), (1,2-bis(cyclopentadienyl)ethane, and (isopropylidene-cyclopentadienyl-fluorenyl).

Preferred X" groups are halide, most preferably chloride groups.

A further class of metal complexes utilized in the present invention correspond to the formula:

$$L_lMX_mX'_nX''_p, \text{ or a dimer thereof}$$

wherein:

L is an anionic, delocalized, π-bonded group that is bound to M, containing up to 50 nonhydrogen atoms;

M is a metal of Group 4 of the Periodic Table of the Elements in the +3 or +4 formal oxidation state;

X is a divalent substituent of up to 50 non-hydrogen atoms that together with L forms a metallocycle with M;

X' is an optional neutral Lewis base ligand having up to 20 non-hydrogen atoms;

X" each occurrence is a monovalent, anionic moiety having up to 20 non-hydrogen atoms, optionally two X" groups together may form a divalent anionic moiety having both valences bound to M, and further optionally X' and X" may be bonded together thereby forming a moiety that is both covalently bound to M and coordinated thereto by means of Lewis base functionality;

l is 1 or 2;

m is 1;

n is a number from 0 to 3;

p is an integer from 1 to 2; and the sum, l+m+p, is equal to the formal oxidation state of M.

Preferred divalent X substituents preferably include groups containing up to 30 nonhydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention correspond to the formula:

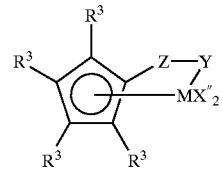

wherein:

M is titanium or zirconium in the +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, each X" is halide, most preferably chloride;

Y is —O—, —S—, —NR*—, —PR*—; and

Z is $SiR^*_2$, $CR^*_2$, $SiR^*_2SiR^*_2$, $CR^*_2CR^*_2$, $CR^*=CR^*$, $CR^*_2SiR^*_2$, $BNR^*_2$, or $GeR^*_2$, wherein: R* is as previously defined.

Illustrative Group 4 metal complexes containing only one L group, that may be employed in the practice of the present invention include:

(tert-butylamido)(tetramethyl-η⁵-cyclopentadienyl) dimethylsilanetitaniumdichloride, (tert-butylamido)(hexamethyl-η⁵-indenyl) dimethylsilanetitaniumdichloride, (tert-butylamido)(2,3-dimethylindenyl) dimethylsilanetitaniumdichloride (tert-butylamido)(2-methyl-4-phenylindenyl) dimethylsilanetitaniumdichloride, (tert-butylamido)(3-(N-pyrrolidinyl)inden-1-yl) dimethylsilanetitaniumdichloride, (tert-butylamido)(2-methyl-s-indacen-1-yl) dimethylsilanetitaniumdichloride, and (tert-butylamido)(3,4-cyclopenta(l)phenanthren-2-yl) dimethylsilanetitaniumdichloride.

Bis(L) containing complexes including bridged complexes suitable for use in the present invention include:
biscyclopentadienylzirconiumdichloride,
bispentamethylcyclopentadienylzirconiumdichloride,
bisindenylzirconiumdichloride,
indenylfluorenylzirconiumdichloride,
bistetrahydroindenylzirconiumdichloride,
bis(t-butylcyclopentadienyl)zirconiumdichloride,
dimethylsilyl-bis(cyclopentadienyl)zirconiumdichloride,
dimethylsilyl-bis(tetramethylcyclopentadienyl) zirconiumdichloride,
dimethylsilyl-bis(3-t-butylcyclopentadien-1-yl) zirconiumdichloride,
dimethylsilyl-bis-(inden-1-yl)zirconiumdichloride,
dimethylsilyl-bis(2-methylinden-1-yl)zirconiumdichloride,
dimethylsilyl-bis(2-methyl-4-phenylinden-1-yl) zirconiumdichloride,
dimethylsilyl-bis(tetrahydroinden-1-yl) zirconiumdichloride, dimethylsilyl-bis(fluoren-1-yl)zirconiumdichloride, (dimethylsilyl-bis(tetrahydrofluoren-1-yl) zirconiumdichloride, (isopropylidene)(cyclopentadien-1-yl)(fluoren-1-yl)zirconiumdichloride, and 1,2-ethanediyl-bis(2-methyl-4-phenylinden-1-yl) zirconiumdichloride.

The metal complex and functionalized support are suitably contacted under conditions to cause formation of covalent or coordinate-covalent bonds between the metal of the complex and the conjugated or non-conjugated double bonds of the substrate. When contacted under reducing conditions, in the presence of, for example, an organometal compound, preferably a Group 2 dihydrocarbyl compound, such as butylethylmagnesium, the metal complex is reduced to the +2 formal oxidation state, and the metal is bonded to the conjugated diene through delocalization of the π-electrons thereof. In the manner, the metal complex is chemically attached to the substrate and is not readily removed from the substrate during use, especially in a slurry polymerization process.

In use as a polymerization catalyst, one or more known activators or activating techniques for metal complex catalysts may be added to the support, incorporated in the reaction mixture or otherwise applied herein, and the monomer mixture is then brought into contact with the supported catalyst. In one embodiment, the activator is incorporated in the addition polymerizable monomer or mixture of monomers to be polymerized, and thereafter the mixture including the activator is contacted with the supported catalyst of the present invention. In another embodiment, the supported catalyst and activator are contacted for a time sufficient to cause active catalyst formation and thereafter the monomer mixture is contacted with the supported, activated, catalyst under polymerization conditions.

Suitable activating cocatalysts for use herein include polymeric or oligomeric alumoxanes, especially methylalumoxane, triisobutyl aluminum modified methylalumoxane, or isobutylalumoxane; neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl) borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium salts of compatible, noncoordinating anions; bulk electrolysis (explained in more detail hereinafter); and combinations of the foregoing activating cocatalysts and techniques. A preferred ion forming compound is a tri($C_{1-20}$-hydrocarbyl)ammonium salt of a tetrakis (fluoroaryl)borate, especially a tetrakis(pentafluorophenyl) borate. The foregoing activating cocatalysts and activating techniques have been previously taught with respect to different metal complexes in the following references: EP-A-277,003, U.S. Pat. Nos. 5,153,157, 5,064,802, 5,321,106, 5,721,185, 5,350,723, 5,425,872, 5,625,087, 5,883,204, 5,919,983, 5,783,512, WO 99/15534, and U.S. Ser. No. 09/251,664, filed Feb. 17, 1999 (WO99/42467).

Combinations of neutral Lewis acids, especially the combination of a trialkylaluminum compound having from 1 to 4 carbons in each alkyl group and a halogenated tri (hydrocarbyl)boron compound having from 1 to 20 carbons in each hydrocarbyl group, especially tris (pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane are especially desirable activating cocatalysts. Preferred molar ratios of Group 4 metal complex: tris(pentafluoro-phenylborane: alumoxane are from 1:1:1 to 1:10:30, more preferably from 1:1:1.5 to 1:5:10.

Suitable ion forming compounds useful as cocatalysts in one embodiment of the present invention comprise a cation which is a Bronsted acid capable of donating a proton, and a compatible, noncoordinating anion, $A^-$. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitrites. Suitable metals include, but are not limited to, aluminum, gallium, niobium or tantalum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*-H)_d^+ (A)^{d-}$$

wherein:

L* is a neutral Lewis base;

$(L^*-H)^+$ is a conjugate Bronsted acid of L*;

$A^{d-}$ is a noncoordinating, compatible anion having a charge of d−, and d is an integer from 1 to 3.

More preferably $A^{d-}$ corresponds to the formula: $[M'Q_4]^-$; wherein:

M' is boron or aluminum in the +3 formal oxidation state; and

Q independently each occurrence is selected from hydride, dialkylamido, halide, hydrocarbyl, hydrocarbyloxide, halo-substituted hydrocarbyl, halo-substituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

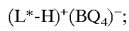

$(L^*-H)^+(BQ_4)^-$;

wherein:
L* is as previously defined;
B is boron in a formal oxidation state of 3; and
Q is a hydrocarbyl-, hydrocarbyloxy-, fluorohydrocarbyl-, fluorohydrocarbyloxy-, hydroxyfluorohydrocarbyl-, dihydrocarbylaluminumoxyfluorohydrocarbyl-, or fluorinated silylhydrocarbyl-group of up to 20 nonhydrogen atoms, with the proviso that in not more than one occasion is Q hydrocarbyl. Most preferably, Q is each occurrence a fluorinated aryl group, especially, a pentafluorophenyl group.

Preferred Lewis base salts are ammonium salts, more preferably trialkyl-ammonium- or dialkylarylammonium-salts containing one or more $C_{12-40}$ alkyl groups. The latter cocatalysts have been found to be particularly suitable for use in combination with not only the present metal complexes but other Group 4 metallocenes as well.

Illustrative, but not limiting, examples of boron compounds which may be used as an activating cocatalyst in the preparation of the improved catalysts of this invention (as well as previously known Group 4 metal catalysts) are tri-substituted ammonium salts such as:
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-dimethylanilinium n-butyltris(pentafluorophenyl)borate,
N,N-dimethylanilinium benzyltris(pentafluorophenyl)borate,
N,N-dimethylanilinium tetrakis(4-(t-butyldimethylsilyl)-2,3,5,6-tetrafluorophenyl)borate,
N,N-dimethylanilinium tetrakis(4-(triisopropylsilyl)-2,3,5,6-tetrafluorophenyl)borate,
N,N-dimethylanilinium pentafluorophenoxytris(pentafluorophenyl)borate,
N,N-diethylanilinium tetrakis(pentafluorophenyl)borate,
N,N-dimethyl-2,4,6-trimethylanilinium tetrakis(pentafluorophenyl)borate,
dimethyltetradecylammonium tetrakis(pentafluorophenyl)borate,
dimethylhexadecylammonium tetrakis(pentafluorophenyl)borate,
dimethyloctadecylammonium tetrakis(pentafluorophenyl)borate,
methylditetradecylammonium tetrakis(pentafluorophenyl)borate,
methylditetradecylammonium (hydroxyphenyl)tris(pentafluorophenyl)borate,
methylditetradecylammonium (diethylaluminoxyphenyl)tris(pentafluorophenyl)borate,
methyldihexadecylammonium tetrakis(pentafluorophenyl)borate,
methyldihexadecylammonium (hydroxyphenyl)tris(pentafluorophenyl)borate,
methyldihexadecylammonium (diethylaluminoxyphenyl)tris(pentafluorophenyl)borate,
methyldioctadecylammonium tetrakis(pentafluorophenyl)borate,
methyldioctadecylammonium (hydroxyphenyl)tris(pentafluorophenyl)borate,
methyldioctadecylammonium (diethylaluminoxyphenyl)tris(pentafluorophenyl)borate,
methyldioctadecylammonium tetrakis(pentafluorophenyl)borate,
phenyldioctadecylammonium tetrakis(pentafluorophenyl)borate,
phenyldioctadecylammonium (hydroxyphenyl)tris(pentafluorophenyl)borate,
phenyldioctadecylammonium (diethylaluminoxyphenyl)tris(pentafluorophenyl)borate,
(2,4,6-trimethylphenyl)dioctadecylammonium tetrakis(pentafluorophenyl)borate,
(2,4,6-trimethylphenyl)dioctadecylammonium (hydroxyphenyl)trispentafluorophenyl)-borate,
(2,4,6-trimethylphenyl)dioctadecylammonium (diethylaluminoxyphenyl) tris(pentafluorophenyl)borate,
(2,4,6-trifluorophenyl)dioctadecylammonium tetrakis(pentafluorophenyl)borate,
(2,4,6-trifluorophenyl)dioctadecylammonium (hydroxyphenyl)tris(pentafluorophenyl)-borate,
(2,4,6-trifluorophenyl)dioctadecylammonium (diethylaluminoxyphenyl)tris(pentafluoro-phenyl)borate,
(pentafluorophenyl)dioctadecylammonium tetrakis(pentafluorophenyl)borate,
(pentafluorophenyl)dioctadecylammonium (hydroxyphenyl)tris(pentafluorophenyl)-borate,
(pentafluorophenyl)dioctadecylammonium (diethylaluminoxyphenyl)tris(pentafluoro-phenyl)borate,
(p-trifluoromethylphenyl)dioctadecylammonium tetrakis(pentafluorophenyl)borate,
(p-trifluoromethylphenyl)dioctadecylammonium (hydroxyphenyl)tris(pentafluoro-phenyl)borate,
(p-trifluoromethylphenyl)dioctadecylammonium (diethylaluminoxyphenyl)tris(pentafluorophenyl)borate,
p-nitrophenyldioctadecylammonium tetrakis(pentafluorophenyl)borate,
p-nitrophenyldioctadecylammonium (hydroxyphenyl)tris(pentafluorophenyl)borate,
p-nitrophenyldioctadecylammonium (diethylaluminoxyphenyl)tris(pentafluorophenyl)borate,
and mixtures of the foregoing, dialkyl ammonium salts such as:
di-(i-propyl)ammonium tetrakis(pentafluorophenyl)borate, methyloctadecylammonium tetrakis(pentafluorophenyl)borate, methyloctadodecylammonium tetrakis(pentafluorophenyl)borate, and dioctadecylammonium tetrakis(pentafluorophenyl)borate;

tri-substituted phosphonium salts such as:
triphenylphosphonium tetrakis(pentafluorophenyl)borate, methyldioctadecylphosphonium tetrakis(pentafluorophenyl)borate, and tri(2,6-dimethylphenyl)phosphonium tetrakis(pentafluorophenyl)borate;

di-substituted oxonium salts such as:
diphenyloxonium tetrakis(pentafluorophenyl)borate, di(o-tolyl)oxonium tetrakis(pentafluorophenyl)borate, and di(octadecyl)oxonium tetrakis(pentafluorophenyl)borate;

di-substituted sulfonium salts such as:
di(o-tolyl)sulfonium tetrakis(pentafluorophenyl)borate, and methylcotadecylsulfonium tetrakis(pentafluorophenyl)borate.

Preferred trialkylammonium cations are methyldioctadecylammonium and dimethyloctadecylammonium. The use of the above Bronsted acid salts as activating cocatalysts for addition polymerization catalysts is known in the art, having been disclosed in U.S. Pat. Nos. 5,064,802, 5,919,983, 5,783,512 and elsewhere. Preferred dialkylarylammonium cations are fluorophenyldioctadecylammonium-, perfluorophenyldioctacecylammonium- and p-trifluoromethylphenyldi(octadecyl)ammonium cations. It should be noted that certain of the cocatalysts, especially those containing a hydroxyphenyl ligand in the borate anion, may require the addition of a Lewis acid, especially a trialkylaluminum compound, to the polymerization mixture or the catalyst composition, in order to form the active catalyst composition.

Another suitable ion forming, activating cocatalyst comprises a salt of a cationic oxidizing agent and a noncoordinating, compatible anion represented by the formula:

$$(Ox^{e+})_d(A^{d-})_e.$$

wherein:

$Ox^{e+}$ is a cationic oxidizing agent having a charge of e+;

e is an integer from 1 to 3; and $A^{d-}$ and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate. The use of the above salts as activating cocatalysts for addition polymerization catalysts is known in the art, having been disclosed in U.S. Pat. No. 5,321,106.

Another suitable ion forming, activating cocatalyst comprises a compound which is a salt of a carbenium ion and a noncoordinating, compatible anion represented by the formula:

$$©^+ A^-$$

wherein:

$©^+$ is a $C_{1-20}$ carbenium ion; and $A^-$ is as previously defined. A preferred carbenium ion is the trityl cation, that is triphenylmethylium. The use of the above carbenium salts as activating cocatalysts for addition polymerization catalysts is known in the art, having been disclosed in U.S. Pat. No. 5,350,723.

A further suitable ion forming, activating cocatalyst comprises a compound which is a salt of a silylium ion and a noncoordinating, compatible anion represented by the formula:

$$R^3{}_3Si(X')_q{}^+A^-$$

wherein:

$R^3$ is $C_{1-10}$ hydrocarbyl, and X', q and $A^-$ are as previously defined.

Preferred silylium salt activating cocatalysts are trimethylsilylium tetrakispentafluorophenylborate, triethylsilylium tetrakispentafluorophenylborate and ether substituted adducts thereof. The use of the above silylium salts as activating cocatalysts for addition polymerization catalysts is known in the art, having been disclosed in U.S. Pat. No. 5,625,087.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

Another class of suitable catalyst activators are expanded anionic compounds corresponding to the formula:

$$(A^{1+a^1})_{b^1}(Z^1 J^1{}_{j^1})^{-c^1}{}_{d^1},$$

wherein:

$A^1$ is a cation of charge $+a^1$, $Z^1$ is an anion group of from 1 to 50, preferably 1 to 30 atoms, not counting hydrogen atoms, further containing two or more Lewis base sites;

$J^1$ independently each occurrence is a Lewis acid coordinated to at least one Lewis base site of $Z^1$, and optionally two or more such $J^1$ groups may be joined together in a moiety having multiple Lewis acidic functionality, $j^1$ is a number from 2 to 12 and $a^1, b^1, c^1$, and $d^1$ are integers from 1 to 3, with the proviso that $a^1 \times b^1$ is equal to $c^1 \times d^1$.

The foregoing cocatalysts (illustrated by those having imidazolide, substituted imidazolide, imidazolinide, substituted imidazolinide, benzimidazolide, or substituted benzimidazolide anions) may be depicted schematically as follows:

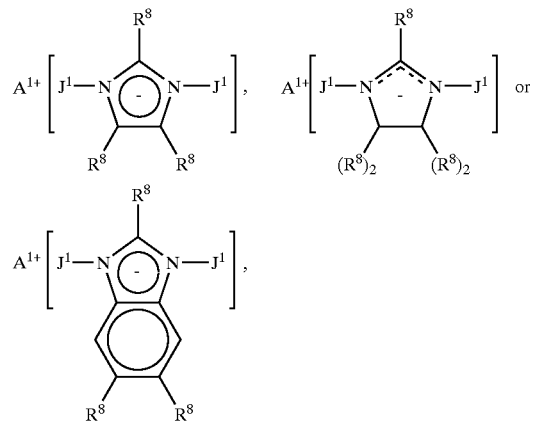

wherein:

$A^{1+}$ is a monovalent cation as previously defined, and preferably is a trihydrocarbyl ammonium cation, containing one or two $C_{10-40}$ alkyl groups, especially the methylbis(tetradecyl)ammonium- or methylbis(octadecyl)ammonium-cation, $R^8$, independently each occurrence, is hydrogen or a halo, hydrocarbyl, halocarbyl, halohydrocarbyl, silylhydrocarbyl, or silyl, (including mono-, di tri (hydrocarbyl)silyl) group of up to 30 atoms not counting hydrogen, preferably $C_{1-20}$ alkyl, and $J^1$ is tris(pentafluorophenyl)borane or tris(pentafluorophenyl)aluminane.

Examples of these catalyst activators include the trihydrocarbylammonium-, especially, methylbis(tetradecyl)ammonium- or methylbis(octadecyl)ammonium-salts of: bis(tris(pentafluorophenyl)borane)imidazolide, bis(tris(pentafluorophenyl)borane)-2-undecylimidazolide, bis(tris(pentafluorophenyl)borane)-2-heptadecylimidazolide, bis(tris(pentafluorophenyl)borane)-4,5-bis(undecyl)imidazolide, bis(tris(pentafluorophenyl)borane)-4,5-bis(heptadecyl)imidazolide, bis(tris(pentafluorophenyl)borane)imidazolinide, bis(tris(pentafluorophenyl)borane)-2-undecylimidazolinide, bis(tris(pentafluorophenyl)borane)-2-heptadecylimidazolinide, bis(tris(pentafluorophenyl)borane)-4,5-bis(undecyl)imidazolinide, bis(tris(pentafluorophenyl)borane)-4,5-bis(heptadecyl)imidazolinide, bis(tris(pentafluorophenyl)borane)-5,6-dimethylbenzimidazolide,
bis(tris(pentafluorophenyl)borane)-5,6-bis(undecyl) benzimidazolide,
bis(tris(pentafluorophenyl)alumane)imidazolide,
bis(tris(pentafluorophenyl)alumane)-2-undecylimidazolide,
bis(tris(pentafluorophenyl)alumane)-2-heptadecylimidazolide, bis(tris(pentafluorophenyl)alumane)-4,5-bis(undecyl)imidazolide,
bis(tris(pentafluorophenyl)alumane)-4,5-bis(heptadecyl) imidazolide,
bis(tris(pentafluorophenyl)alumane)imidazolinide,
bis(tris(pentafluorophenyl)alumane)-2-undecylimidazolinide,
bis(tris(pentafluorophenyl)alumane)-2-heptadecylimidazolinide,
bis(tris(pentafluorophenyl)alumane)-4,5-bis(undecyl) imidazolinide,
bis(tris(pentafluorophenyl)alumane)-4,5-bis(heptadecyl) imidazolinide,
bis(tris(pentafluorophenyl)alumane)-5,6-dimethylbenzimidazolide, and
bis(tris(pentafluorophenyl)alumane)-5,6-bis(undecyl) benzimidazolide.

A further class of suitable activating cocatalysts include cationic Group 13 salts corresponding to the formula:

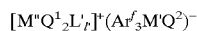

wherein:
M" is aluminum, gallium, or indium;
M' is boron or aluminum;
$Q^1$ is $C_{1-20}$ hydrocarbyl, optionally substituted with one or more groups which independently each occurrence are hydrocarbyloxy, hydrocarbylsiloxy, hydrocarbylsilylamino, di(hydrocarbylsilyl)amino, hydrocarbylamino, di(hydrocarbyl)amino, di(hydrocarbyl)phosphino, or hydrocarbylsulfido groups having from 1 to 20 atoms other than hydrogen, or, optionally, two or more $Q^1$ groups may be covalently linked with each other to form one or more fused rings or ring systems;
$Q^2$ is an alkyl group, optionally substituted with one or more cycloalkyl or aryl groups, said $Q^2$ having from 1 to 30 carbons;
L' is a monodentate or polydentate Lewis base, preferably L' is reversibly coordinated to the metal complex such that it may be displaced by an olefin monomer, more preferably L' is a monodentate Lewis base;
l' is a number greater than zero indicating the number of Lewis base moieties, L', and
$Ar^f$ independently each occurrence is an anionic ligand group; preferably $Ar^f$ is selected from the group consisting of halide, $C_{1-20}$ halohydrocarbyl, and $Q^1$ ligand groups, more preferably $Ar^f$ is a fluorinated hydrocarbyl moiety of from 1 to 30 carbon atoms, most preferably $Ar^f$ is a fluorinated aromatic hydrocarbyl moiety of from 6 to 30 carbon atoms, and most highly preferably $Ar^f$ is a perfluorinated aromatic hydrocarbyl moiety of from 6 to 30 carbon atoms.

Examples of the foregoing Group 13 metal salts are alumicinium tris(fluoroaryl)borates or gallicinium tris (fluoroaryl)borates corresponding to the formula: $[M"Q^1{}_2L'_{l'}]^+(Ar^f{}_3BQ^2)^-$, wherein M" is aluminum or gallium; $Q^1$ is $C_{1-20}$ hydrocarbyl, preferably $C_{1-8}$ alkyl; $Ar^f$ is perfluoroaryl, preferably pentafluorophenyl; and $Q^2$ is $C_{1-8}$ alkyl, preferably $C_{1-8}$ alkyl. More preferably, $Q^1$ and $Q^2$ are identical $C_{1-8}$ alkyl groups, most preferably, methyl, ethyl or octyl.

The foregoing activating cocatalysts may also be used in combination. An especially preferred combination is a mixture of a tri(hydrocarbyl)aluminum or tri(hydrocarbyl) borane compound having from 1 to 4 carbons in each hydrocarbyl group or an ammonium borate with an oligomeric or polymeric alumoxane compound.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is employed in large quantity, generally at least 100 times the quantity of metal complex on a molar basis. Tris (pentafluorophenyl)borane, where used as an activating cocatalyst is employed in a molar ratio to the metal complex of form 0.5:1 to 10:1, more preferably from 1:1 to 6:1 most preferably from 1:1 to 5:1. The remaining activating cocatalysts are generally employed in approximately equimolar quantity with the metal complex.

Suitable polymerizable monomers include ethylenically unsaturated monomers, acetylenic compounds, conjugated or non-conjugated dienes, and polyenes. Preferred monomers include olefins, for examples alpha-olefins having from 2 to 20,000, preferably from 2 to 20, more preferably from 2 to 8 carbon atoms and combinations of two or more of such alpha-olefins. Particularly suitable alpha-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1,1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

In general, the polymerization may be accomplished at conditions well known in the prior art for Ziegler-Natta or Kaminsky-Sinn type polymerization reactions conducted under slurry or gas phase polymerization conditions. Preferred polymerization temperatures are from 0–250° C. Preferred polymerization pressures are from atmospheric to 3000 atmospheres (300 MPa).

Molecular weight control agents can be used in combination with the present cocatalysts. Examples of such molecular weight control agents include hydrogen, silanes or other known chain transfer agents. Modifiers, such as Lewis base compounds, can be added to the polymerization, to slow the initial polymerization rate, especially in a gas-phase polymerization, in order to prevent localized overheating of the catalyst. Such, modifiers provide a longer lasting catalyst composition and more uniform catalyst and polymer product composition.

Gas phase processes for the polymerization of $C_{2-6}$ olefins, especially the homopolymerization and copolymerization of ethylene and propylene, and the copolymerization of ethylene with $C_{3-6}$ α-olefins such as, for example, 1-butene, 1-hexene, 4-methyl-1-pentene are well known in the art. Such processes are used commercially on a large scale for the manufacture of high density polyethylene (HDPE), medium density polyethylene (MDPE), linear low density polyethylene (LLDPE) and polypropylene, especially isotactic polypropylene.

The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported above a perforated plate, the fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, in addition to the cooling provided by the cooled recycle gas, is to feed a volatile liquid to the bed to provide an evaporative cooling effect. The volatile liquid employed in this case can be, for example, a volatile inert liquid, for example, a saturated hydrocarbon having 3 to 8, preferably 4 to 6, carbon atoms. In the case that the monomer or comonomer itself is a volatile liquid, or can be condensed to provide such a liquid this can be suitably be fed to the bed to provide an evaporative cooling effect. Examples of olefin monomers which can be employed in this manner are olefins containing from 3 to eight, preferably from 3 to six carbon atoms. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream, as described, for example, in EP-A-89691, U.S. Pat. No. 4,543,399, WO 94/25495 and U.S. Pat. No. 5,352,749, which are hereby incorporated by reference. A particularly preferred method of recycling the liquid to the bed is to separate the liquid from the recycle gas stream and to reinject this liquid directly into the bed, preferably using a method which generates fine droplets of the liquid within the bed. This type of process is described in WO 94/28032, the teachings of which are also hereby incorporated by reference.

The polymerization reaction occurring in the gas fluidized bed is catalyzed by the continuous or semi-continuous addition of catalyst. The catalyst can also be subjected to a prepolymerization step, for example, by polymerizing a small quantity of olefin monomer in a liquid inert diluent, to provide a catalyst composite comprising catalyst particles embedded in olefin polymer particles.

The polymer is produced directly in the fluidized bed by catalyzed (co)polymerization of the monomer(s) on the fluidized particles of polymer, supported catalyst, or prepolymer within the bed. Start-up of the polymerization reaction is achieved using a bed of preformed polymer particles, which, preferably, is similar to the target polyolefin, and conditioning the bed by drying with inert gas or nitrogen prior to introducing the catalyst, the monomer(s) and any other gases which it is desired to have in the recycle gas stream, such as a diluent gas, hydrogen chain transfer agent, or an inert condensable gas when operating in gas phase condensing mode. An antistatic agent, such as Stadis™ hydrocarbon based antistatic agent (available from DuPont Chemicals) may be included in the reaction mixture to prevent polymer agglomerate formation according to known techniques as well. The produced polymer is discharged continuously or discontinuously from the fluidized bed as desired, optionally exposed to a catalyst kill and optionally pelletized.

Supported catalysts for use in slurry polymerization may be used according to previously known techniques. Generally such catalysts are prepared by the same techniques as are employed for making supported catalysts used in gas phase polymerizations. Slurry polymerization conditions generally encompass polymerization of a $C_{2-20}$ olefin, diolefin, cycloolefin, or mixture thereof in an aliphatic solvent at a temperature below that at which the polymer is readily soluble in the presence of a supported catalyst. Slurry phase processes particularly suited for the polymerization of $C_{2-6}$ olefins, especially the homopolymerization and copolymerization of ethylene and propylene, and the copolymerization of ethylene with $C_{3-8}$ α-olefins such as, for example, 1-butene, 1-hexene, 4-methyl-1-pentene and 1-octene are well known in the art. Such processes are used commercially on a large scale for the manufacture of high density polyethylene (HDPE), medium density polyethylene (MDPE), linear low density polyethylene (LLDPE) and polypropylene, especially isotactic polypropylene.

It is understood that the present invention is operable in the absence of any component that has not been specifically disclosed. The following examples are provided in order to further illustrate the invention and are not to be construed as limiting. Unless stated to the contrary, all parts and percentages are expressed on a weight basis. Where stated the term "room temperature" refers to a temperature from 20 to 25° C., the term "overnight" refers to a time from 12 to 18 hours, and the term "mixed alkanes" refers to the aliphatic solvent, Isopar™ E, available from Exxon Chemicals Inc.

EXAMPLE 1

Tris(perfluorophenyl)borane was obtained as a solid from Boulder Scientific Inc. and used without further purification. Triethylaluminum (TEA) in toluene was purchased from Aldrich Chemical Co. All solvents were purified using the technique disclosed by Pangborn et al, *Organometallics*, 1996, 15, 1518–1520. All compounds and solutions were handled under an inert atmosphere (dry box).

Silica (Grace-Davison 948, available from Grace-Davison division of W.R. Grace) was dehydrated at 250° C. for 3 hours in air. Then, the silica was slurried in hexane and the resulting mixture treated with a 1.00 M solution of triethylaluminum (TEA) in hexane in an amount to provide 2.1 mmol TEA/g silica. The mixture was agitated for 30 minutes and then the solids were isolated by filtration, washed twice with hexane and dried under reduced pressure. Because more than a stoichiometric amount of triethylaluminum compared to the quantity of reactive sites on the silica was employed, the resulting material had substantially no residual hydroxyl functionality remaining on the surface of the silica.

2 g Of the above TEA treated silica was added to 20 ml of hexane and 0.020 g of trans-8, trans-10-dodecadiene-1-ol were added and the resulting mixture agitated for 1 h at room temperature. Then, 0.035 g of(t-butylamido)dimethyl (tetramethylcyclopentadienyl)titaniumdichloride was added and the suspension agitated until the titanium complex dissolved. Butylethylmagnesium (0.058 g) was added to the mixture and the resulting slurry was refluxed for 1 hour. After cooling to room temperature, tris(pentafluorophenyl) boron (0.077 g) was added and the slurry again agitated for 0.5 hours, after which the slurry was filtered, washed with hexane until the elutant was colorless, and the resulting supported catalyst dried under dynamic vacuum prior to use.

Gas Phase Polymerization

A 2.5-L stirred, fixed bed autoclave was charged with 200 g dry NaCl. Stirring was begun at 300 rpm. The reactor was pressurized to 0.7 MPa ethylene and heated to 70° C. 1-hexene (3000 ppm) was introduced to the reactor. About 0.5 g of TEA treated silica was added to the reactor as a scavenger. In a separate vessel, 0.075 g of supported catalyst was mixed with an additional 0.5 g of TEA treated silica scavenger. The combined catalyst and scavenger were subsequently injected into the reactor. Ethylene pressure was maintained on demand while hexene was fed to the reactor to maintain the desired concentration. The temperature of the reactor was maintained at 70° C. by a circulating water bath. After 90 minutes the reactor was depressurized, and the salt and polymer were removed. The polymer was washed with copious quantities of distilled water to remove the salt, dried at 50° C., and stabilized by addition of a hindered phenol antioxidant (Irganox™ 1010 from Ciba Geigy Corporation) and a phosphorus stabilizer. Yield was 50 g of ethylene/hexene copolymer corresponding to an activity of 5.0 g/g·hr·MPa.

What is claimed is:

1. A functionalized catalyst support comprising a particulated, solid support material having chemically bonded thereto a conjugated or non-conjugated diene or alkyne containing ligand group.

2. A functionalized catalyst support according to claim 1 having a chemical structure of the following formula:

$$So(D_d)$$

wherein:

So is a particulated, solid support material;

D is a conjugated or non-conjugated diene or alkyne containing ligand attached to the particulated solid support containing up to 20 atoms other than hydrogen; and d is a positive number that is equal to the number of D groups attached to the substrate, So.

3. A functionalized catalyst support according to claim 1 or 2 wherein the support is silica, and d is chosen to provide a concentration of D groups on the substrate from $1 \times 10^{-5}$ μmole/gram to 1 mmole/gram, more preferably from 0.1 μmole/gram to 500 μmole/g.

4. A functionalized catalyst support according to claim 3, wherein So possesses non-ionic, Lewis acid functionality a', of the formula $-Me_mK_k$, on the surface thereof, wherein:

Me, is a Group 2, 12 or 13 metal, especially Al, bonded to the substrate, So,

K is an extractable or exchangeable, anionic ligand group, especially a hydrocarbyl or halohydrocarbyl group of up to 20 atoms, not counting hydrogen, and m and k are selected to provide charge balance.

5. A supported catalyst composition comprising the reaction product of:

(a) the functionalized catalyst support of claim 1, and (b) a Group 3–10 or Lanthanide metal complex containing a substituent which reacts with the functionalized catalyst support to thereby form a supported catalyst composition that is capable of activation to form an active polymerization catalyst for the polymerization of addition polymerizable monomers.

6. A supported catalyst composition according to claim 5, wherein the Group 3–10 metal complex contains at least one π-bonded anionic ligand group which is a conjugated or non-conjugated, cyclic or non-cyclic dienyl group, an allyl group, aryl group, or a substituted derivative thereof.

7. A supported catalyst composition according to claim 6, wherein the π-bonded anionic ligand group is a cyclopentadienyl group or a derivative thereof.

8. A supported catalyst composition according to any one of claims 5–7 additionally comprising an activator capable of activating the Group 3–10 of Lanthanide metal complex so as to be catalytically active for the polymerization of addition polymerizable monomers.

9. A polymerization process comprising contacting one or more addition polymerizable monomers under gas phase or slurry polymerization conditions with a catalyst composition according to claim 8.

10. A process according to claim 9, wherein ethylene is polymerized, optionally with one or more comonomers to form an ethylene homopolymer or copolymer.

* * * * *